United States Patent [19]

Bond et al.

[11] Patent Number: 4,693,812

[45] Date of Patent: Sep. 15, 1987

[54] MAGNETIC DRUM SEPARATOR

[75] Inventors: Bruce E. Bond, Belmont, Mass.; William J. Harrold, Indian Mills, N.J.

[73] Assignee: Raytheon Company, Lexington, Mass.

[21] Appl. No.: 741,725

[22] Filed: Jun. 6, 1985

Related U.S. Application Data

[63] Continuation of Ser. No. 474,369, Mar. 11, 1983, abandoned.

[51] Int. Cl.[4] .............................................. B01D 25/00

[52] U.S. Cl. .................................... 209/224; 209/226; 210/222; 324/263; 335/306

[58] Field of Search ................................ 209/212–214, 209/216, 221, 223 R, 223 A, 224, 226; 335/302–306; 210/695, 222; 324/263

[56] References Cited

U.S. PATENT DOCUMENTS

| | | | |
|---|---|---|---|
| 2,678,729 | 5/1954 | Spodig | 209/219 |
| 2,992,736 | 7/1961 | Buus et al. | 209/223.1 |
| 3,087,616 | 4/1963 | Pierson | 209/221 |
| 3,142,008 | 7/1964 | Kajihara | 335/302 |
| 3,197,028 | 7/1965 | Watson et al. | 209/221 |
| 3,292,126 | 12/1966 | Palm | 335/302 |
| 3,418,613 | 12/1967 | Trikilis | 324/263 X |
| 3,926,792 | 12/1975 | Buford | 209/219 |
| 4,046,679 | 9/1977 | Schloemann | 209/212 |
| 4,194,968 | 3/1980 | Pfalzer et al. | 209/214 |
| 4,248,707 | 2/1981 | Granger | 210/695 |

FOREIGN PATENT DOCUMENTS

| | | | |
|---|---|---|---|
| 0549484 | 12/1957 | Canada | 209/213 |
| 0725110 | 5/1932 | France | 209/224 |
| 0748523 | 7/1980 | U.S.S.R. | 335/302 |

*Primary Examiner*—Charles Hart
*Attorney, Agent, or Firm*—John T. Meaney; Richard M. Sharkansky

[57] ABSTRACT

A magnetic materials separator including an axially inclined drum disposed for axial rotation within the curvature of an arcuate magnet structure which extends axially of the drum and is disposed in close-spaced relationship with the outer surface of the drum. The magnet structure comprises an axially extending series of arcuate magnet yokes, each comprising an axially laminated array of arcuate magnet sub-assemblies which are alternately polarized in opposite axial directions. Each of the sub-assemblies comprises an arcuate magnet axially polarized and sandwiched between a arcuate pair of soft magnetic flux concentrators which have respective axial thicknesses between five and twenty percent of one-half the axial thickness of the sandwiched magnet.

14 Claims, 17 Drawing Figures

MAGNETIC DRUM SEPARATOR

This application is a continuation of application Ser. No. 474,369 filed Mar. 11, 1983 and now abandoned.

BACKGROUND OF THE INVENTION

1. Field of the Invention

This invention relates generally to magnetic material separators and is concerned more particularly with a magnetic drum separator provided with a permanent magnet structure for producing within the drum an axially varying magnetic field having a relatively high gradient as well as a relatively high intensity.

2. Discussion of the Prior Art

In the recycle processing of municipal trash materials, the "as received" items of raw trash generally are deposited in a conventional shredder wherein the items are reduced to particles of more manageable size. The resulting particles of commingled materials then may be directed into a stream, as by feeding them onto an endless conveyor belt, for example. The stream of particles from the shredder may be conducted to a conventional air classifier wherein light fraction materials, such as paper particles, for example, are removed from the stream. The particles of heavy fraction materials, such as metallic particles, for example, remaining in the stream may be conducted to a conventional magnetic separator for removal of ferromagnetic materials, such as iron and steel particles, for example. From the magnetic separator, the stream of nonferromagnetic materials may be conducted to a non-ferrous separator for removal of electrically conductive particles made of nonferromagnetic materials, such as aluminum, for example.

In U.S. Pat. No. 4,003,830 granted to E. Schloemann and assigned to the present assignee, there is shown a materials separator including an endless conveyor belt disposed for carrying a stream of heavy fraction particles around the periphery of a conventional magnetic drum separator. As a result, particles of ferromagnetic material in the stream are magnetically attracted and cling to the belt as it passes around the magnetic drum separator. When the belt carries the particles of ferromagnetic material beyond the influence of the magnetic drum separator, the particles of ferromagnetic material drop from the belt into a suitably disposed container. On the other hand, the particles of nonferromagnetic material in the stream leave the belt tangentially when the belt passes around the magnetic drum separator and are deposited in a chute which feeds the nonferromagnetic particles in a stream down a ramp-type non-ferrous materials separator.

The stream of nonferromagnetic particles slides down a smooth surface layer of nonmagnetic material overlying a permanent magnet array which induces eddy currents in the electrically conductive particles of nonferromagnetic material. These eddy currents produce magnetic fields which coact with the magnetic fields of the permanent magnet array to develop resultant forces having lateral components which deflect the electrically conductive particles of nonferromagnetic material laterally out of the stream. The particles of nonferromagnetic material which are not electrically conductive, such a glass, for example, are unaffected by the magnetic fields of the permanent magnet array and continue to slide linearly down the ramp-type separator.

However, in practice, it is found that the conventional magnetic materials separator may not remove all of the particles of ferromagnetic material from the stream. Composite particles comprising a small magnetic portion dominated by a larger non-magnetic portion may be prevented from clinging or even being attracted to the belt when it passes around the magnetic drum separator. These composite particles may include clothing having therein fasteners made of magnetic material, paper matchbooks having therein staples made of magnetic material, fasteners having therein eyelets made of magnetic material, and the like. Consequently, these composite particles of magnetic and nonmagnetic materials pass with the stream of nonferromagnetic particles to the ramptype nonferrous separator where they may be attracted sufficiently by the permanent magnet array to cling to the overlying smooth surface layer and clog the ramp-type separator thereby interferring with its efficient operation.

SUMMARY OF THE INVENTION

Accordingly, these and other disadvantages of the prior art are overcome by this invention providing a magnetic materials separator having an axially inclined drum disposed for axial rotation within a stationary arcuate magnet structure. The structure includes an arcuate magnet yoke disposed for curving circumferentially about a transverse portion of the drum and extended axially in close-spaced relationship with the cylindrical outer surface of the drum. The magnet yoke comprises an axially laminated array of arcuate magnet sub-assemblies, each of which includes an arcuate magnet polarized axially and sandwiched between a respective pair of arcuate flux concentrators made of soft magnetic material. The magnet sub-assemblies are disposed in the laminated array such that they are conformingly curved in the circumferential direction but the magnets of successive sub-assemblies are polarized in opposite axial directions.

As a result, the magnet yoke establishes in the drum axially varying magnetic fields which are especially suitable for attracting small particles of ferromagnetic material from commingled particles of nonferromagnetic material. Also, the soft magnetic flux concentrators of each sub-assembly aid in providing the magnetic field with a higher gradient and a higher intensity than would normally be expected by those skilled in the art. The resulting high gradient and high intensity magnetic field is especially suitable for attracting composite particles having small portions made of ferromagnetic materials and larger portions made of nonferromagnetic materials. It has been found that the optimal magnetic qualities of the magnetic field are obtained when the sandwiching flux concentrators are provided with respective axial thicknesses between five and twenty percent of one-half the axial thickness of the interposed or sandwiched magnet.

BRIEF DESCRIPTION OF THE DRAWINGS

For a better understanding of the invention, reference is made in the following detailed description to the accompanying drawings wherein.

DESCRIPTION OF THE PREFERRED EMBODIMENT

Figure 1:
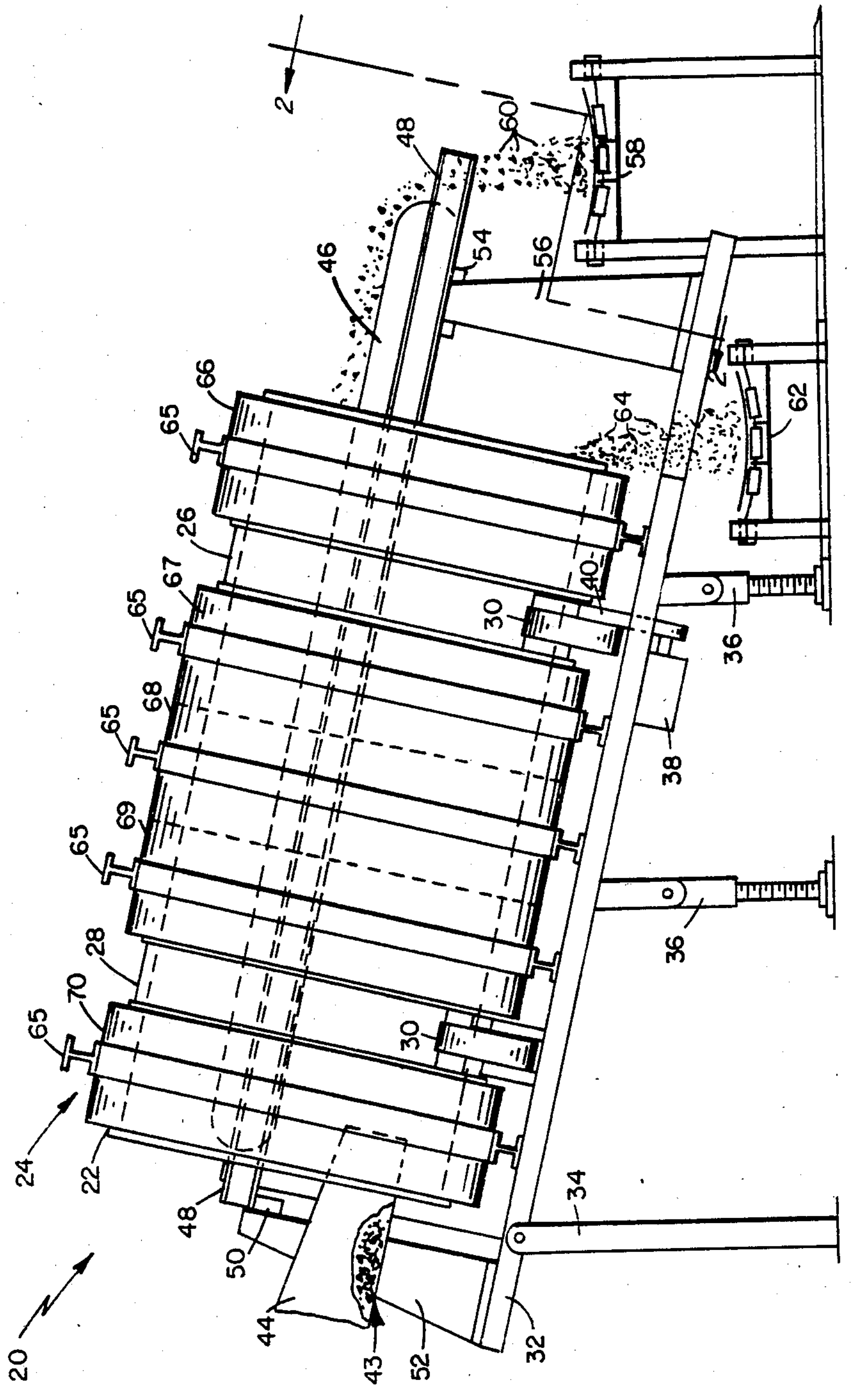
FIG. 1 is a schematic view of a magnetic materials separator system embodying the invention.
Figure 2:
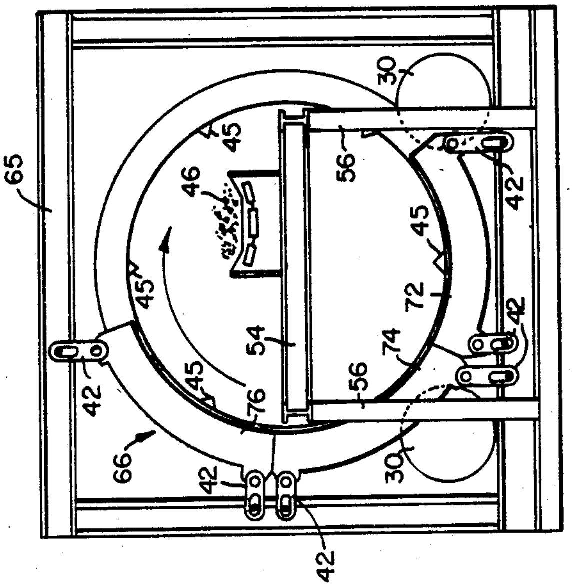
FIG. 2 is a transverse sectional view taken along the Line 2—2 in FIG. 1 and looking in the direction of the arrow.

Referring to the drawings wherein like characters of reference designate like parts, there is shown in FIGS. 1 and 2 a magnetic materials separator assembly 20 including and axially inclined drum 22 supported for axial rotation within a stationary permanent magnet structure 24 curving circumferentially about the drum and extending axially along its outer surface. The drum 22 is made of nonmagnetic material, such as austenitic stainless steel, for example, and is provided with a cylindrical wall having a suitable thickness, such as between one-eighth and one-quarter of an inch, for example. Also, drum 22 has opposing open ends and is provided with suitable dimensions, such as about five feet in diameter and about twelve feet in length, for example.

Circumferentially secured, as by bolts (not shown), for example, to the outer surface of drum 22 and adjacent opposing ends thereof are respective circular metal tires 26 and 28. Each of the tires 26 and 28 is frictionally engaged by a respective pair of chordally disposed rollers 30 which rotatably support the drum. The rollers 30 are rotatably supported on a longitudinally sloping platform or skid 32 which is pivotally attached to upper end portions of a pair of laterally spaced legs 34 (only one of which is shown) and axially spaced pairs of laterally spaced jack screws 36. The jack screws 36 provide means for adjustably disposing the skid 32 and the drum 22 at a suitable angle of axial inclination, such as about fifteen degrees, for example. Secured to the underside of skid 32 is a rotatable drive means comprising an electric motor 38 which is coupled, as by a V-belt 40, for example, to an overlying roller 30 for frictionally rotating the drum 22.

An input feed means comprising chute 44 extends axially in cantilever fashion into the upper end portion of drum 22 and below the axial centerline thereof. Thus, the chute 44 is positioned for depositing on arcuate portion of drum 22 adjacent the skid 32 a stream 43 of commingled particles of ferromagnetic and nonferromagnetic materials. The inner surface of drum 22 may be provided with an annular array of angularly spaced lifters 45 which extend axially along the inner surface of the drum and aid in tumbling the commingled particles deposited in the drum from the chute 44. Axially disposed in the upper end portion of drum 22 and above the axial centerline thereof is an end portion of an endless conveyor belt 46 which may be of the troughed type. The conveyor belt 46 is positioned for receiving the separated particles of ferromagnetic material and carrying them out of the opposing lower end portion of drum 22.

Conveyor belt 46 may be supported by an axially extending pair of laterally spaced rails 48 which have opposing end portions protruding from opposing ends of drum 22. The end portions of rails 48 extending out of the upper end of drum 22 may be supported on a transverse beam 50 which is secured to upper end portions of laterally spaced brackets 52 having lower end portions secured to the skid 32. Similarly, the end portions of rails 48 extending out of the lower end of drum 22 may be supported on a transverse beam 54 which is secured to upper end portions of laterally spaced brackets 56 having lower end portions secured to the skid 32. This end portion of conveyor belt 46 extending out of the lower end of drum 22 overlies a troughed conveyor 58 which is positioned for receiving the separated particles 60 of ferromagnetic material from the belt 46. Disposed adjacent the lower end of drum 22 is a troughed conveyor 62 positioned for receiving the particles 64 of nonferromagnetic material tumbled out of the lower end of drum 22.

The magnet structure 24 extends arcuately around the drum 22 from about four o'clock to about eleven o'clock as viewed from output or lower end of drum 22. Also, the magnet structure 24 extends axially along the drum 22 in close-spaced relationship with outer surface thereof. Magnet structure 24 may comprise an axially extending series of magnet yokes 66, 67, 68, 69 and 70, respectively, each of which is supported within a respective I-beam frame 65 on the skid 32. The magnet yokes 67, 68 and 69 are disposed in abutting relationship with one another between the tires 26 and 28, respectively. Magnet yokes 66 and 70 are axially spaced from the respective yokes 67–69 and are disposed adjacent respective ends of the drum 22. Since the magnet yokes 66–70, respectively, are identical in structure, only the magnet yoke 66 will be described in detail. However, it is to be understood that the described structure is equally applicable to each of the magnet yokes 67, 68, 69 and 70, respectively.

Figure 3:
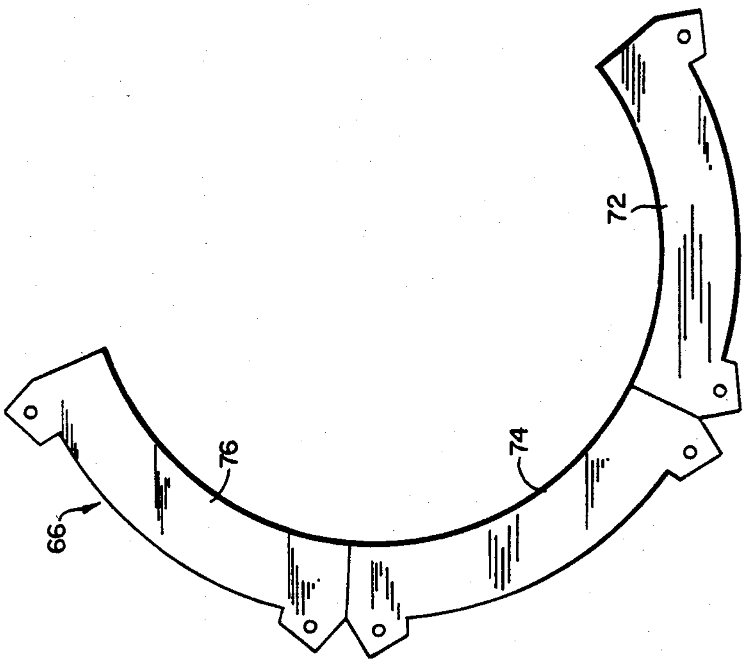
FIG. 3 is an enlarged end view of one magnetic yoke in the magnet structure shown in FIGS. 1 and 2.

As shown in FIG. 3, the magnet yoke 66 may comprise a circumferentially extending array of yoke segments 72, 74 and 76, respectively, which subtend substantially equal arc segments, such as sixty-six and two-thirds degrees, for example, of the yoke 66. Since the respective yoke segments 72, 74 and 76 are identical in structure, only the yoke segment 72 will be described in detail. However, it is to be understood that the described structure also is applicable to the yoke segments 74 and 76, respectively.

Figure 4:
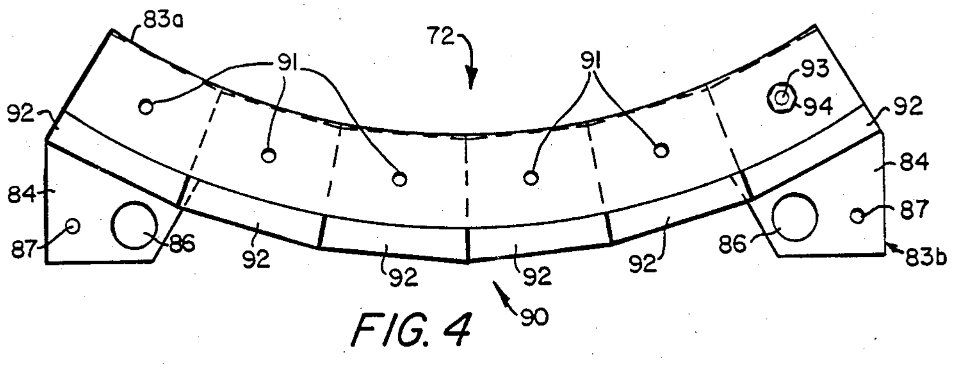
FIG. 4 is a more enlarged end view of one yoke segment shown in FIG. 3.
Figure 5:
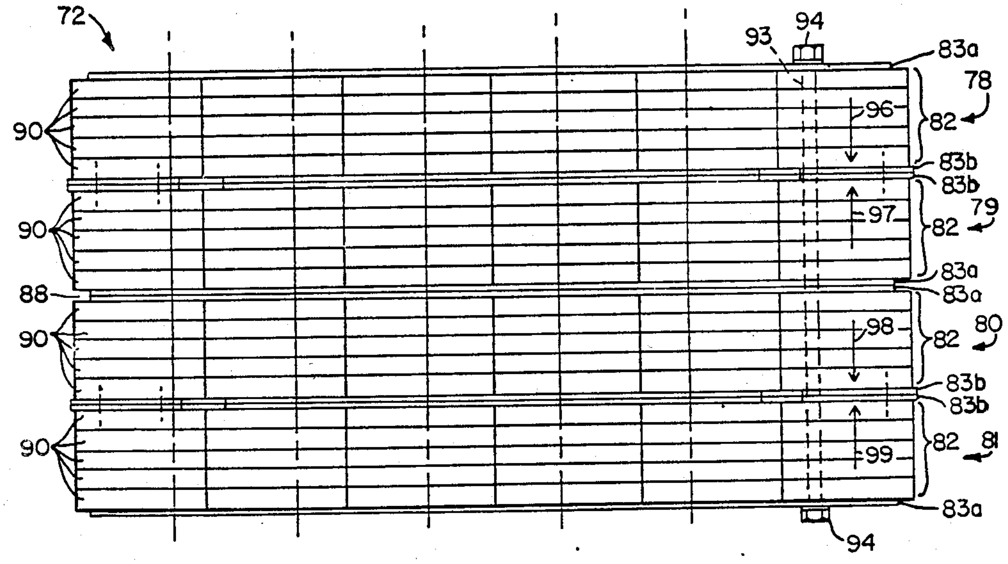
FIG. 5 is an elevational view of the yoke segment shown in FIG. 4 and looking at the outer arcuate surface thereof.

As shown in FIGS. 4 and 5, the yoke segment 72 comprises an axially laminated array of arcuate magnet sub-assemblies 78, 79, 80 and 81, respectively, which are aligned with one another and have conforming configurations. Each of magnet sub-assemblies 78, 79, 80 and 81 comprises a respective arcuate magnet 82 sandwiched between respective arcuate flux concentrators 83*a* and 83*b* which are made of soft magnetic material, such as plain carbon steel, for example. The flux concentrators 83*b* have end portions provided with respective ears 84 which extend radially outward of the arcuate concentrators. Also, each of the ears 84 is provided with a respective pair of holes 86 and 87. The holes 86 provide means for lifting the segment 72 into place; and the holes 87 provide means for adjustably securing the segment 72 to the frame 65 through respective interconnecting strips 42 of nonmagnetic metal, such as austenitic stainless steel, for example.

Each of the magnets 82 may comprise an axially stacked array of five magnet layers 90 which are uniformly polarized in the axial direction to produce the magnet 82. Also, each of the magnet layers 90 may comprise an arcuate series of six juxtaposed magnet blocks 92 which are uniformly polarized in the axial direction to produce the magnet layer 90. The magnet blocks 92 may be made of a ceramic magnet material, such as strontium ferrite, for example, and be provided with respective trapizoidal configurations which subtend an arc, such as about eleven degrees, for example in the circumferential direction. Also, each of the magnet blocks 92 may be provided with suitable dimensions, such as about six inches in the radial direction and an axial thickness of about nine-tenths of an inch in the axial direction, for example. Consequently, five of the axially stacked magnet layers 90 will provide a magnet 82 with an axial thickness of about four and one-half inches, for example.

Each of the magnet sub-assemblies 78, 79, 80 and 81 may be fabricated by cementing, as with epoxy adhesive, for example, six of the trapezoidal blocks 92 in juxtaposed relationship on a flux concentrator 83*b*, with all of their magnetic north poles adjacent the flux concentrator 83*b*, to form the adjacent magnet layer 90. Similarly, another six trapezoidal magnet blocks 92 are cemented in superimposed relationship on respective blocks 92 of the first magnet layer 90, with all of their magnetic north poles adjacent the flux concentrator 83*b*, to form the second layer 90. This procedure is repeated until five magnet layers 90 are formed and then the flux concentrator 83*a* is cemented on last formed magnet layer 90 to complete the arcuate magnet sub-assembly having a magnetic north pole adjacent the flux concentrator 83*b* and a magnetic south pole adjacent the flux concentrator 83*a*. The sub-assembly 80 then may be disposed in overlaying relationship on the sub-assembly 81 with their respective flux concentrators 83*b* adjacent one another. The sub-assembly 79 then may be placed on the sub-assembly 80 with their respective flux concentrators 83*a* adjacent one another; and the sub-assembly 78 may be placed on the sub-assembly 79 with their respective flux concentrators 83*b* adjacent one another. Then, suitable fasteners, such as stainless steel rods 93 may be passed through aligned holes 91 in the respective flux concentrators 83*a* and 83*b*, and in the interposed magnet blocks 92. Respective nuts 94 may be threaded onto opposing end portions of the rods 93 and tightened against the adjacent flux concentrators 83*a* and 83*b*, respectively, for securing the sub-assemblies 78, 79, 80 and 81 firmly together and completing the yoke segment 72.

Figure 6:
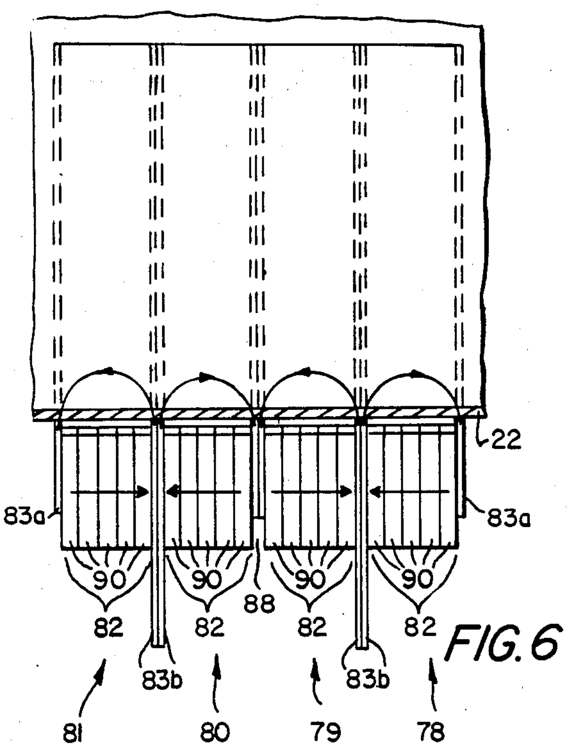
FIG. 6 is a fragmentary elevational view of the yoke segment shown in FIG. 4 with the drum disposed adjacent the inner arcuate surface thereof.

Accordingly, the sub-assemblies 78, 79, 80 and 81 of the yoke segment 72 are alternately polarized in opposite axial directions as denoted by the arrows 96, 97, 98 and 99, respectively. As shown in FIG. 6, the yoke segment 72 is mounted to curve around a transverse portion of the drum 22 and in close-spaced relationship, such as one-eighth to one-quarter of an inch, for example, with the outer surface of drum 22. As a result, there is established within a drum 22 an axially varying magnetic field which is expecially suitable for magnetically attracting particles of ferromagnetic materials tumbled within the drum 22. However, in order to attract composite particles having small portions thereof made of ferromagnetic material, it also is necessary for the magnetic field established within drum 22 to have a relatively high magnetic field gradient and a relatively high magnetic field intensity.

Figure 7:
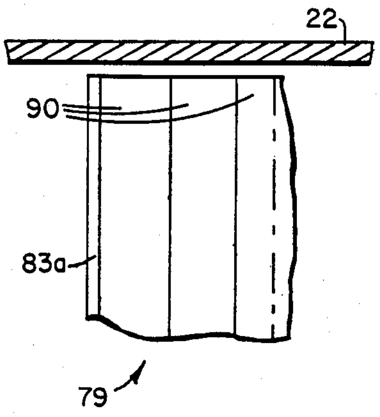
FIG. 7 is a further enlarged fragmentary view of a portion of the drum and yoke segment shown in FIG. 6.
Figure 8A:
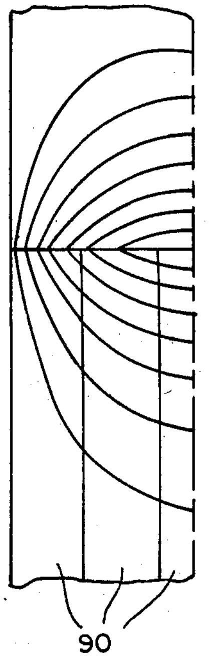
FIG. 8A is a plot of the magnetic flux field produced by the structure shown in FIG. 7 but without the flux concentrator present.
Figure 8B:
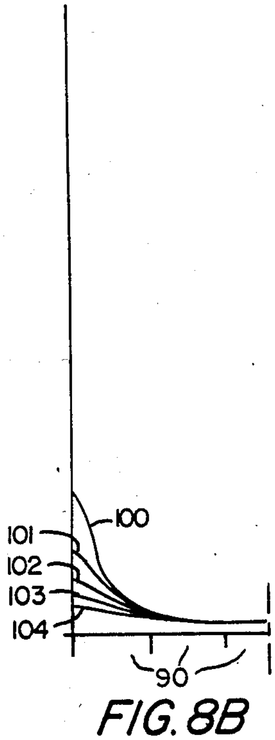
FIG. 8B is a graph of the magnetic force index established in the drum for the structural conditions associated with FIG. 8A.

By considering, as shown in FIG. 7, only the flux concentrator 83*a* and the adjacent two and one-half magnet layers 90 of magnet 82 is sub-assembly 79, the influence of the flux concentrator 83*a* on the magnetic field produced radially inward of magnet 82 and along its one-half axial length may be studied. As shown in FIG. 8A, when there is no flux concentrator 83*a* present, there is produced along the one-half axial length of magnet 82 and radially inward thereof a magnetic field having flux lines which are spread relatively wide apart. Consequently, the magnetic field shown in FIG. 8A has a relatively low gradient and magnetic field intensity. In FIG. 8B, there is shown a corresponding computer plot of curves 100, 101, 102, 103 and 104 representing respective distances of one-quarter, three-eighths, one-half, five-eighths and three-quarters of an inch radially inward of magnet 82. Each of the curves 100, 101, 102, 103 and 104 indicates the magnetic force index (ordinate) exerted on ferromagnetic particles 60 at that radial distance, as a function of axial distance (abcissa) along the inner surface of magnet 82.

Figure 9A:
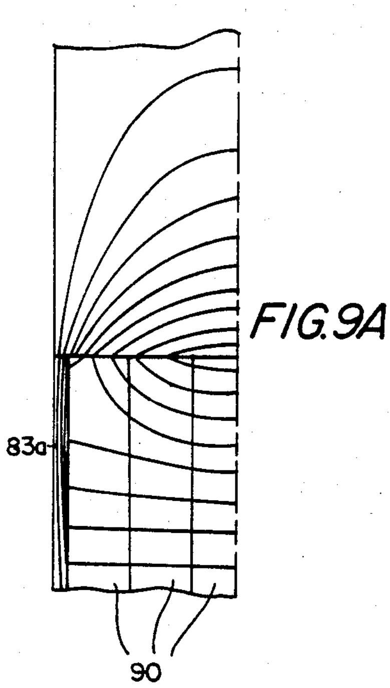
FIG. 9A is a plot of the magnetic flux field produced by the structure shown in FIG. 7 when the flux concentrator has a thickness of one-eighth of an inch.
Figure 9B:
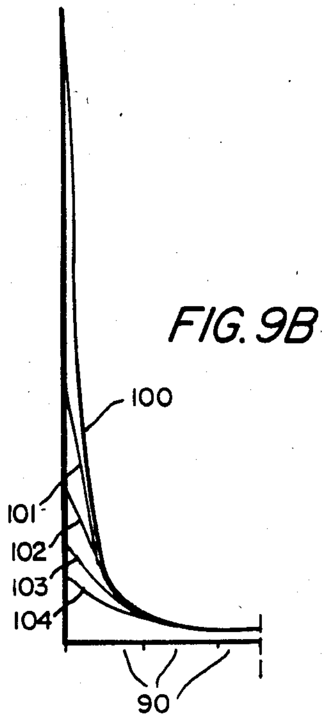
FIG. 9B is a graph of the magnetic force index established in the drum for the structural conditions associated with FIG. 9A.

As shown in FIG. 9A, when the flux concentrator 83*a* is present and has an axial thickness of which is about one-eighth of an inch, there is produced radially inward of magnet 82 and along the half-axial length thereof a magnetic flux field having lines crowded close together at the flux concentrator 83*a*. Consequently, the flux field shown in FIG. 9A has a very high gradient and magnetic field intensity as compared to the flux field shown in FIG. 8A. In FIG. 9B, there is shown the corresponding magnetic force index (ordinate) exerted radially inward of magnet 82 as a function of axial distance (abcissa) along the inner surface of magnet 82. The respective curves 100, 101, 102, 103 and 104 plotted in FIG. 9B represent the same radial distances as the respective curves 100, 101, 102, 103 and 104 shown in FIG. 8B. Note that radially inward from the flux concentrator 83*a* having an axial thickness of about one-eighth of an inch the magnetic force index is much greater at the distances represented by each of the curves 100, 101, 102, 103 and 104 shown in FIG. 9B than at the same distances represented by each of the curves 100, 101, 102, 103 and 104, respectively shown in FIG. 8B.

Figure 10A:
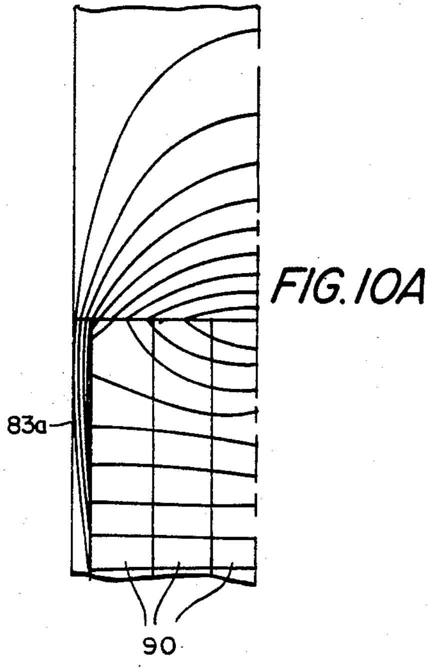
FIG. 10A is a plot of the magnetic flux field produced by the structure shown in FIG. 7 when the flux concentrator has a thickness of one-quarter of an inch.

As shown in FIG. 10A, when the flux concentrator 83*a* has an axial thickness of about one-quarter of an inch, there is produced radially inward of magnet 82 and along the half-axial length thereof a magnetic flux field having lines less crowded than the lines of the magnetic field shown in FIG. 9A but still much more crowded than the lines of the magnetic field shown in FIG. 8A. Consequently, the flux field shown in FIG. 10A has a gradient not quite as high as the gradient of the flux field produced with a one-eighth axial thickness flux concentrator but still much higher than the gradient of the flux field produced without a flux concentrator.

Figure 10B:
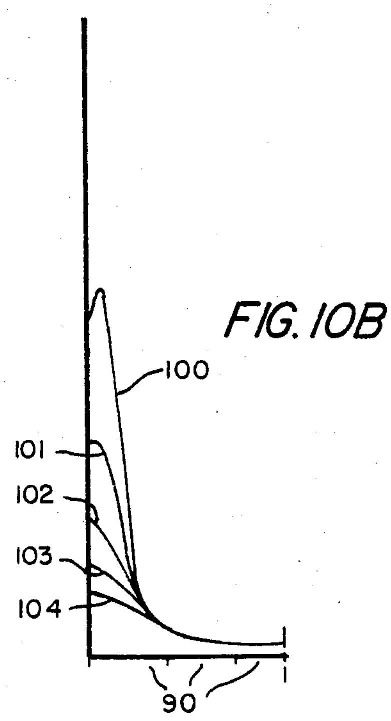
FIG. 10B is a graph of the magnetic force index established in the drum for the structural conditions associated with FIG. 10A.

In FIG. 10B, there is shown the corresponding magnetic force index (ordinate) as a function of axial distance (abcissa) along the inner surface of magnet 82 for the flux concentrator 83*a* having an axial thickness of about one-quarter of an inch. The magnetic force index curves 100, 101, 102, 103 and 104 plotted in FIG. 10B represent the same radial distances represented by the respective curves 100, 101, 102, 103 and 104 shown in FIGS. 9B and 8B. Note that the magnetic force index at each of the radial distances represented by the respective curves 100–104 shown in FIG. 10B is less than at each of the corresponding radial distances represented by the respective curves 100–104 shown in FIG. 9B, but is still much greater than at each of the corresponding radial distances represented by the respective curves 100–104 shown in FIG. 8B. Also, note that, as a result of flux concentrator 83*a* having a greater axial thickness, the peaks of curves 100–104 respectively in FIG. 10B have noticeably shifted axially toward the midportion of magnet 82, in comparison with the corresponding curves 100–104 shown in FIG. 9B.

Figure 11A:
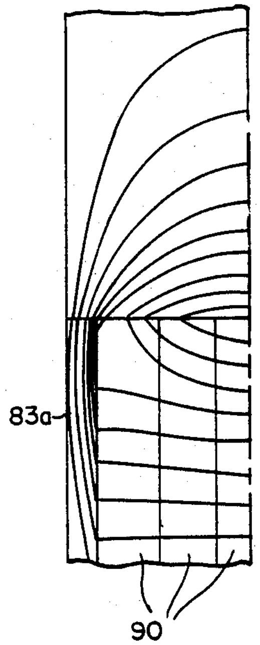
FIG. 11A is a plot of the magnetic flux field produced by the structure shown in FIG. 7 when the flux concentrator has a thickness of three-eighths of an inch.
Figure 11B:
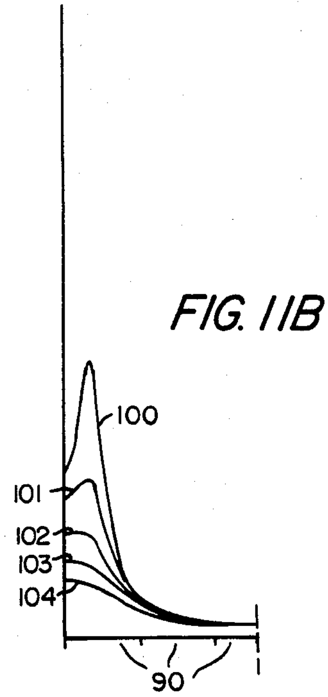
FIG. 11B is a graph of the magnetic force index established in the drum for the structural conditions associated with FIG. 11A.

As shown in FIG. 11A, when the flux concentrator 83*a* has an axial thickness of about three-eighths of an inch, the resulting magnetic field produced radial inward of magnet 82 has a gradient and magnetic intensity which are less than the gradient and magnetic intensity of the field shown in FIGS. 10A and 9A. However, the magnetic field shown in FIG. 11A still has a higher gradient and magnetic intensity than the magnetic field shown in FIG. 8A and produced without the aid of a flux concentrator. Also, as shown in FIG. 11B, the magnetic force indices exerted at the respective radial distances represented by the corresponding curves 100, 101, 102, 103 and 104 are less than exerted at the same radial distances represented by the curves 100–104 shown in FIGS. 10B and 9B, respectively. On the other hand, the curves 100–104 in FIG. 11B show greater magnetic force indices exerted at the respective radial distances than the magnetic force indices exerted at the same radial distances represented by the respective curves 100–104 shown in FIG. 8B. A comparison of FIG. 11B with FIG. 10B also shows that, due to the flux concentrator 83*a* having a three-eighths of an inch axial thickness, the peaks of the curves 100–104 in FIG. 11B are shifted still further in the axial direction toward the midportion of magnet 82.

Figure 12A:
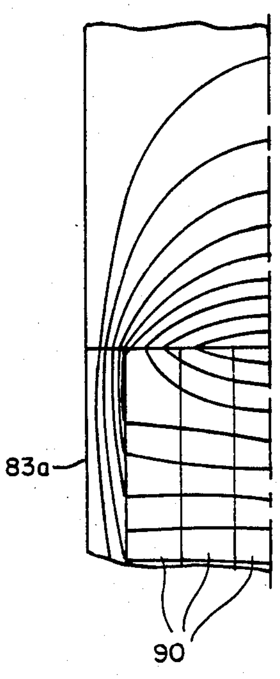
FIG. 12A is a plot of the magnetic flux field produced by the structure shown in FIG. 7 when the flux concentrator has a thickness of one-half of an inch.
Figure 12B:
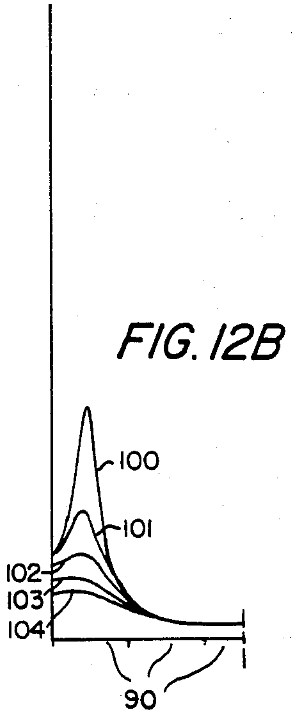
FIG. 12B is a graph of the magnetic force index established in the drum for the structural conditions associated with FIG. 12A.

As shown in FIG. 12A, when the flux concentrator 83*a* has an axial thickness of about one-half of an inch, the resulting magnetic field produced radially inward of magnet 82 has a gradient and magnetic intensity which are less than the gradient and magnetic intensity of the fields shown in FIGS. 9A, 10A and 11A, respectively. However, the magnetic field shown in FIG. 12A still has a higher gradient and magnetic intensity than the gradient and magnetic intensity of the field shown in FIG. 8A and produced without the aid of a flux concentrator. Also, as shown in FIG. 12B, the magnetic force indices exerted at the respective radial distances represented by the corresponding curves 100, 101, 102, 103 and 104 are less than exerted at the same radial distances represented by the curves 100–104 shown in FIGS. 9B, 10B and 11B, respectively. On the other hand, the curves 100–104 in FIG. 12B show greater magnetic force indices exerted at the respective radial distances than the magnetic force indices exerted at the same radial distances represented by the respective curves 100–104 shown in FIG. 8B. A comparison of FIG. 12B with FIG. 11B also shows that, due to the flux concentrator 83*a* having a one-half inch axial thickness, the peaks of curves 100, 101 and 102 are shifted still further in the axial direction toward the midportion of magnet 82.

Thus, it has been determined that when the flux concentrators 83*a* and 83*b* have respective axial thicknesses between five and twenty percent of the half-axial thickness of sandwiched magnet 82, there is produced in drum 22 magnetic fields having unexpectedly high gradients and magnetic intensities. This type of magnetic field is especially useful in attracting from commingled particles 64 of nonferromagnetic materials, small ferromagnetic particles 60 including composite particles having small portions made of ferromagnetic materials. Consequently, when each of the magnet sub-assemblies 78, 79, 80 and 81, as shown in FIG. 6, is provided with flux concentrators 83*a* and 83*b* having axial thicknesses in the specified range, the entire yoke segment 72 produces in drum 22 axially varying magnetic fields having unexpectedly high gradients and magnetic intensities radially inward from the flux concentrators 83*a* and 83*b*, respectively. Furthermore, where each of yoke segments 72, 73 and 74, shown in FIG. 3, and each of the yokes 66, 67, 68, 69 and 70, shown in FIG. 1, is fabricated as described, the resulting magnetic materials separator assembly 20 is particularly well adapted, in comparison to conventional magnetic materials separators of the prior art, for efficiently removing ferromagnetic particles from commingled nonferromagnetic particles.

As shown in FIG. 2, the magnetically attracted ferromagnetic particles cling to the inner surface of drum 22 while adjacent the arcuate magnet structure 24. When the drum 22 rotates the magnetically attracted particles 60 beyond the curvature of the magnet structure 24, the particles 60 are carried by the movement of drum 22 caused by the rotary motor 38 over onto the endless conveyor belt 46. As a result, the conveyor belt 46 must be positioned to the right of the axial centerline of drum 22 for receiving the released particles 60 and carrying them out of the lower end of drum 22 for deposit on conveyor belt 58.

It also should be noted in FIGS. 4–6 that at least the flux concentrators 83*a* are provided with respective radial thicknesses which are less than the radial thicknesses of the magnets 82 to provide radial undercuts 88 in the outer periphery of yoke segment 72 where the flux concentrators 83*a* are disposed. The flux concentrators 83*b* also may be provided with respective radial thicknesses which are less than the radial thicknesses of magnets 82 to provide periodically occurring undercuts 88 in the outer periphery of yoke segment 72 where the axially laminated sub-assemblies 78, 79, 80 and 81 are disposed in abutting relationship with one another. Where the undercuts 88 occur in the yoke segment 72 more magnetic flux is directed radially inward of the segment 72 than radially outward thereof because of shorter magnetic paths provided between successive concentrator portions along the inner surface of segment 72, as compared to the relatively longer magnetic paths between successive concentrator portions along the outer surface of segment 72 due to the undercuts 88.

Thus, there has been described herein a magnetic materials separator having an axially inclined drum disposed for axially rotation with an arcuate magnetic structure comprising an axially laminated array of arcuate magnet sub-assemblies which are alternately polarized in opposite axial directions. Each of the magnet sub-assemblies comprises an arcuate magnet axially polarized and sandwiched between conformingly curved flux concentrators which are made of soft magnetic material and provided with respective axial thicknesses between five and twenty percent of the half-axial thickness of the sandwiched magnet. As a result, there is produced with the drum an axially varying magnetic field having a suitably high gradient and magnetic intensity for attracting and separating from commingled nonferromagnetic particles, ferromagnetic particles including composite particles having small portions made of ferromagnetic material and larger portions made of nonferromagnetic materials.

From the foregoing, it will be apparent that all of the objectives of this invention have been achieved by the structures and methods described herein. It also will be apparent, however, that various changes may be made by those skilled in the art without departing from the spirit of the invention as expressed in the appended claims. It is also to be understood, therefore, that all matter shown and described herein is to be interpreted as illustrative rather than restrictive of the invention.

What is claimed is:

1. A magnetic materials separator comprising:

material conductor means for directing along a predetermined path particles of ferromagnetic and nonferromagnetic materials; and magnet means disposed in spaced relationship with said path for projecting into said path a magnetic field, said magnet means including a permanent magnet polarized in the direction of said path and sandwiched between two soft magnetic flux concentrators, each of the flux concentrators having in the direction of said path a thickness between five and twenty percent of one-half the thickness of the magnet in the direction of said path.

2. A magnetic materials separator as set forth in claim 1 wherein said material conductor means comprises a drum having an open end disposed for receiving said particles of ferromagnetic and nonferromagnetic materials and having an open end disposed for permitting egress of separated particles of ferromagnetic and nonferromagnetic materials.

3. A magnetic materials separator as set forth in claim 2 wherein said drum is axially rotatable and said magnet means is stationary relative to the drum.

4. A magnetic materials separator comprising:

material conductor means for directing along a predetermined path particles of ferromagnetic and nonferromagnetic materials; and magnet means disposed in spaced relationship with said path for projecting into said path a magnetic field, said magnet means including a permanent magnet polarized in the direction of said path and sandwiched between two magnetic flux concentrators, the permanent magnet and the flux concentrators being disposed along a common surface in adjacent spaced relationship with said material conductor means and said flux concentrators being provided with respective magnetic flux conductor means dimensioned relative to said magnet for projecting into said materials conductor means said magnetic field and attracting said particles of ferromagnetic materials.

5. A magnetic materials separator as set forth in claim 4 wherein the material conductor means is relatively movable with respect to said magnet means and said common surface is spaced a predetermined distance from said material conductor means.

6. A magnet materials separator as set forth in claim 5 wherein each of said magnetic flux conductor means comprises soft magnetic material having a respective thickness dimension between five and twenty percent of a corresponding thickness dimension of said magnet along said common surface.

7. A magnetic materials separator comprising:

an axially inclined drum disposed for axial rotation; and magnet means disposed externally of the drum and in spaced relationship therewith, the magnet means having an axially extended portion curved arcuately about the drum for projecting radially into said drum an axially varying magnetic field having periodic peak gradients, said magnet means including an arcuate magnet polarized in the axial direction and sandwiched between two flux concentrators, each having an axial thickness dimensioned in accordance with the axial extension of said arcuate magnet.

8. A magnetic materials separator as set forth in claim 7 wherein said magnet means includes an arcuate magnet yoke comprised of an axially laminated array of magnet subassemblies alternately polarized in opposite axial directions.

9. A magnetic materials separator as set forth in claim 8 wherein each of said sub-assemblies comprises an arcuate magnet sandwiched between two arcuate flux concentrators made of soft magnetic material.

10. A magnetic materials separator as set forth in claim 9 wherein each of said flux concentrators has an axial thickness between five and twenty percent of one-half the axial thickness of the sandwiched magnet.

11. A magnetic materials separator as set forth in claim 10 wherein each of said magnets comprises an axially stacked series of magnet layers polarized uniformly in the axial direction.

12. A magnetic materials separator as set forth in claim 11 wherein each of said magnet layers comprises a juxtaposed array of magnet blocks uniformly polarized in the axial direction.

13. A magnetic materials separator as set forth in claim 9 wherein at least one of said flux concentrators is provided with a radial thickness less than the radial thickness of said sandwiched magnet.

14. A magnet materials separator as set forth in claim 7 wherein said magnet means includes an axially extending series of arcuate magnet yokes, each comprising an axially laminated array of magnet sub-assemblies alternately polarized in opposite axial directions.

* * * * *